(12) United States Patent
Li

(10) Patent No.: US 6,909,722 B1
(45) Date of Patent: Jun. 21, 2005

(54) METHOD AND APPARATUS FOR PROPORTIONATELY MULTIPLEXING DATA STREAMS ONTO ONE DATA STREAM

(75) Inventor: Peng Li, San Diego, CA (US)

(73) Assignee: Qualcomm, Incorporated

( * ) Notice: Subject to any disclaimer, the term of this patent is extended or adjusted under 35 U.S.C. 154(b) by 531 days.

(21) Appl. No.: 09/612,825

(22) Filed: Jul. 7, 2000

(51) Int. Cl.[7] ............................................. H04L 12/56
(52) U.S. Cl. ................................... 370/412; 370/327
(58) Field of Search ................................ 370/327, 335, 370/336, 337, 342, 343, 412, 437, 419, 420, 463, 238

(56) References Cited

U.S. PATENT DOCUMENTS

| | | | |
|---|---|---|---|
| 4,901,307 A | | 2/1990 | Gilhousen et al. |
| 5,103,459 A | | 4/1992 | Gilhousen et al. |
| 5,898,670 A | * | 4/1999 | Hoebeke et al. ............ 370/468 |
| 5,901,147 A | | 5/1999 | Joffe |
| 5,936,948 A | * | 8/1999 | Sicher ........................ 370/310 |
| 5,999,534 A | * | 12/1999 | Kim ....................... 370/395.42 |
| 6,008,777 A | * | 12/1999 | Yiu ............................. 341/173 |
| 6,009,108 A | | 12/1999 | Takehara et al. |
| 6,201,793 B1 | * | 3/2001 | Chen et al. ................. 370/238 |
| 6,240,079 B1 | * | 5/2001 | Hamalainen et al. ....... 370/337 |

* cited by examiner

*Primary Examiner*—Wellington Chin
*Assistant Examiner*—William Schultz
(74) *Attorney, Agent, or Firm*—Philip R. Wadsworth; Thien T. Nguyen; Albert J. Harnois

(57) ABSTRACT

A method and system that enables proportionately multiplexing a plurality of data stream into one data stream is disclosed. A mobile station has applications that produce separate data streams. Example applications include voice, signaling, E-mail and web applications. The data streams are combined by a multiplexer module into one data stream called the transport stream. The transport stream is sent over the reverse link to a BTS. The multiplexer module combines the data streams onto the transport stream according to their relative proportions and priorities.

5 Claims, 12 Drawing Sheets

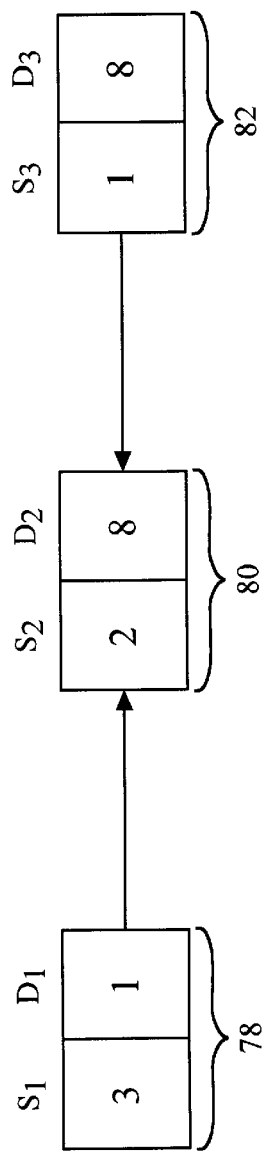
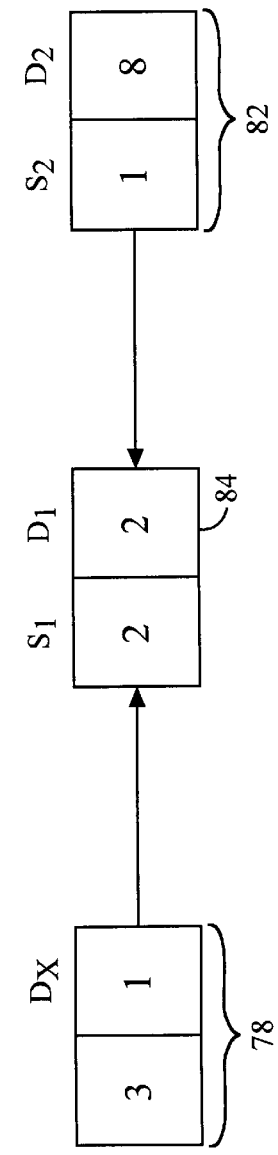
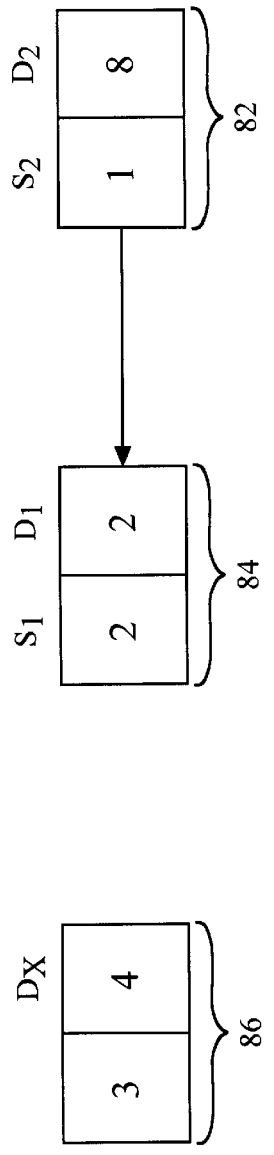
FIG. 12
FIG. 13
FIG. 14

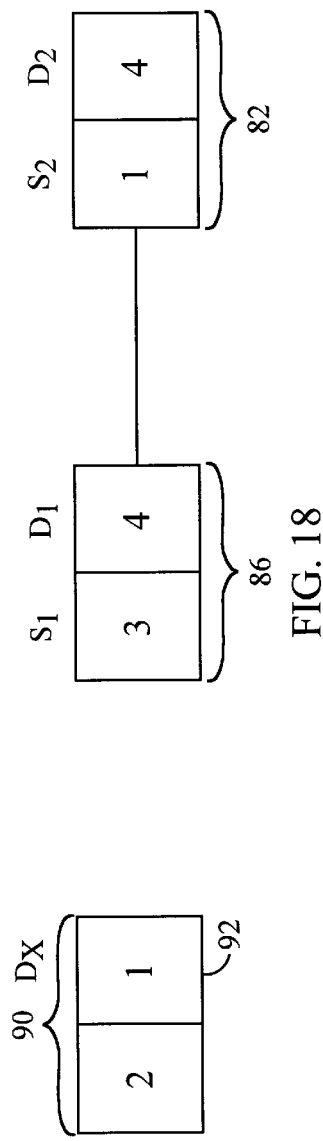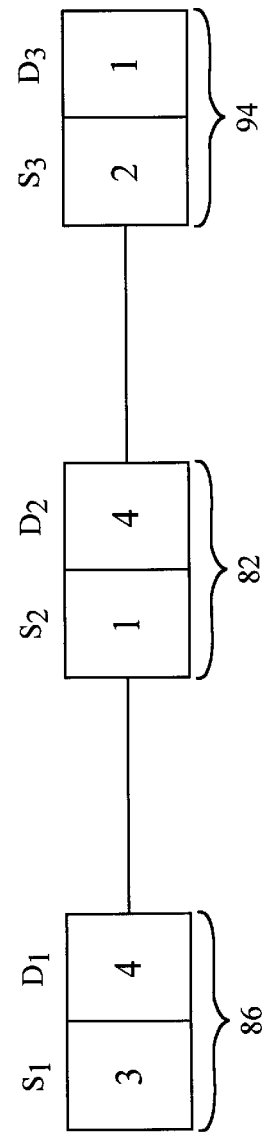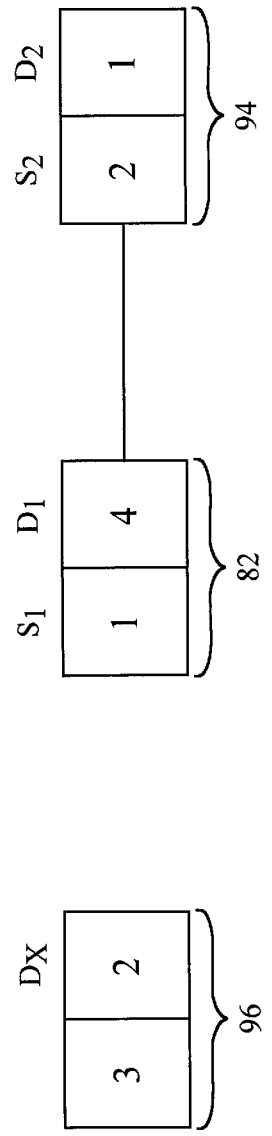

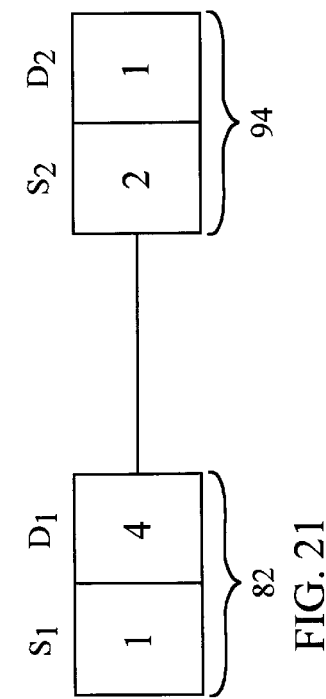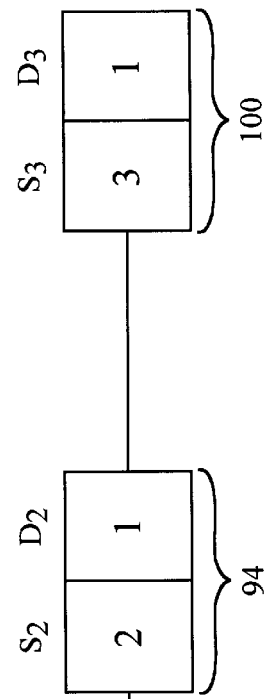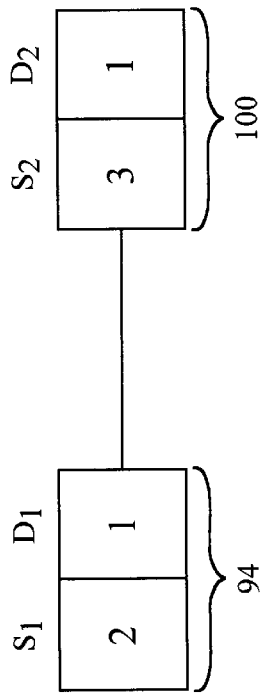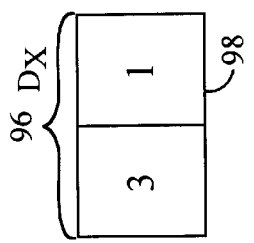
FIG. 21
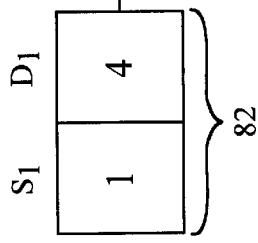
FIG. 22
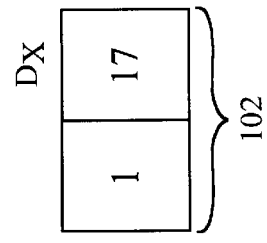
FIG. 23

METHOD AND APPARATUS FOR PROPORTIONATELY MULTIPLEXING DATA STREAMS ONTO ONE DATA STREAM

BACKGROUND OF THE INVENTION

I. Field of the Invention

The present invention pertains generally to the field of communications and more specifically to a novel and improved system and method for proportionately multiplexing a plurality of data streams into one data stream.

II. Description of the Related Art

The use of code division multiple access (CDMA) modulation techniques is one of several techniques for facilitating communications in which a large number of system users are present. Although other techniques such as time division multiple access (TDMA), frequency division multiple access (FDMA), and AM modulation schemes such as amplitude companded single sideband (ACSSB) are known, CDMA has significant advantages over these other techniques. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both of which are assigned to the assignee of the present invention, the disclosures of which are incorporated by reference herein.

Choosing an allocation scheme for allocating frames from multiple data streams onto one data stream is difficult. Many allocation schemes fall short of performance requirements. For example, a shortest-job-first (SJF) scheme would starve longer jobs. An application residing on a subscriber unit/ mobile phone may produce a data stream comprising many frames that must be processed in a timely fashion. Yet, in an SJF scheme, the processing of a data stream having many frames may be starved because of other data streams having fewer frames to be processed. Likewise, a last-in-first-out (LIFO) scheme could starve frames from a data stream that was first in a LIFO queue. On the other hand, a first-in-first-out (FIFO) scheme does not accommodate the relative importance of data streams. In FIFO, every data stream must wait its turn. Consequently, an extremely important data stream may have to wait for a number of less important data streams to be processed. An allocation scheme that does not starve any data stream is desired. It is desirable to have a limit as to when a frame from a data stream will be processed.

Some allocation schemes do not take into account the number of frames that are in a data stream. For example, FIFO and LIFO are only concerned with when a frame from a data stream enters a processing queue. They do not take into consideration the size of data streams. An allocation scheme that takes into consideration the size of the data streams while at the same time not starving a data stream is desired.

SUMMARY OF THE INVENTION

The present invention is directed to a system and method for multiplexing a plurality of data streams onto one data stream for transmission. The method creates a list of queues, each queue representing a data stream and having a length inversely proportional to a proportion value of the data stream, wherein each data stream comprises at least one packet or frame. In one embodiment of the invention, each data stream comprises at least one packet. In another embodiment of the invention, each data stream comprises at least one frame. Each queue is incremented by the inverse of the proportion value for each transport frame. In one embodiment of the invention, a packet is scheduled from the data stream corresponding to a filled queue. In another embodiment of the invention, frames are distributed from the plurality of data streams onto a single data stream based on both whether a queue representing a data stream is full and on priority values of the data streams. In still another embodiment of the invention, frames are distributed based primarily on whether a queue representing a data stream is full and secondarily based on the priority of the queues.

In one embodiment of the invention, a plurality of applications provides a plurality of data streams to be multiplexed by a multiplexer. In another embodiment of the invention, subcriber units provide a plurality of data streams to be multiplexed by a multiplexer within a base station. In still another embodiment of the invention, a plurality of base stations provides a plurality of data streams to be multiplexed by a multiplexer within a base station controller.

In one embodiment of the invention, a subscriber unit comprises a memory, a plurality of applications residing in the memory, each application producing a data stream wherein each data stream comprises at least one frame, and a multiplexer configured to receive each data stream and uniformly distributing frames from the plurality of data streams onto a single data stream. In one embodiment of the invention, the multiplexer is configured to receive each data stream and uniformly distribute frames from the plurality of data streams onto a single data stream based on the proportion value.

In another embodiment of the invention, the multiplexer is configured to receive each data stream and uniformly distribute frames from the plurality of data streams onto a single data stream based primarily on the data streams' proportion value and secondarily on the data streams' priority.

In still another embodiment of the invention, a wireless communication system comprises a subscriber unit, a base station coupled to the subscriber unit and a base station controller coupled to the base station. The subscriber unit has a plurality of applications and a multiplexer, wherein each application produces a data stream as input to the multiplexer and each data stream comprises at least one frame. The multiplexer uniformly distributes frames from the data streams onto a single stream based on the data streams' proportion value.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 12 shows the removed element inserted before the i-th element;

FIG. 13 shows $D_2$ after being changed;

FIG. 14 shows the head element removed from the list;

FIG. 18 shows $D_x$ after being changed;

FIG. 19 shows the removed element inserted as the n=3 element;

FIG. 20 shows the head element is removed from the list;

FIG. 21 shows $D_x$ after being changed;

FIG. 22 shows the removed element inserted as the n=3 element;

FIG. 23 shows the head element removed from the list;

DETAILED DESCRIPTION

Figure 1:
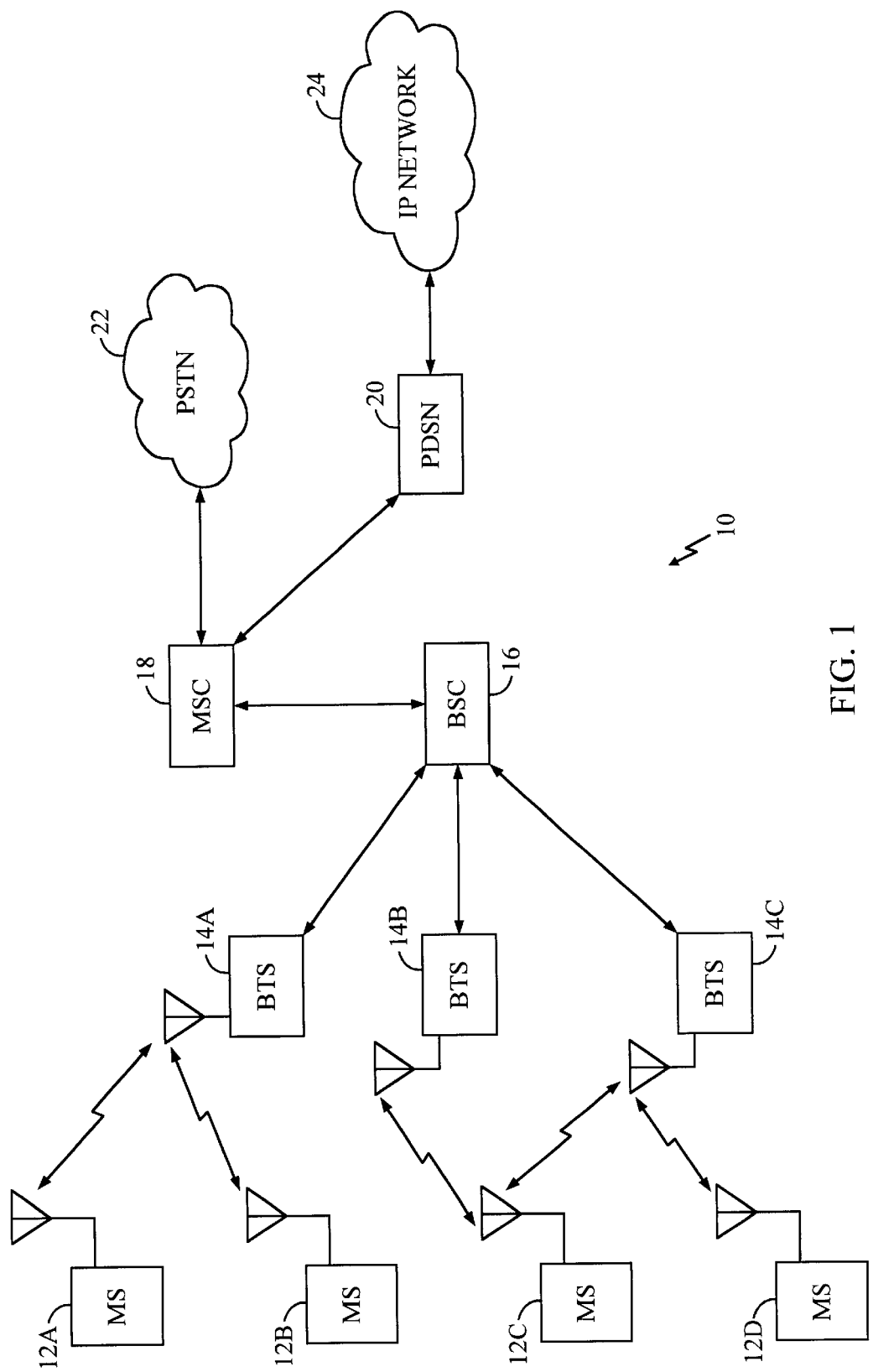
FIG. 1 is a schematic overview of an exemplary W-CDMA cellular telephone system.

An exemplary cellular mobile telephone system in which the present invention is embodied is illustrated in FIG. 1. For purposes of example this system is described herein within the context of a W-CDMA cellular communications system. However, it should be understood that the invention is applicable to other types of communication systems, such as personal communication systems (PCS), wireless local loop, private branch exchange (PBX) or other known systems. Furthermore, systems utilizing other well known transmission modulation schemes such as TDMA and FDMA as well as other spread spectrum systems may employ the present invention.

As illustrated in FIG. 1, a wireless communication network 10 generally includes a plurality of mobile stations (also called subscriber units or user equipment) 12a–12d, a plurality of base stations (also called base station transceivers (BTSs) or Node B) 14a–14c, a base station controller (BSC) (also called radio network controller or packet control function 16), a mobile station controller (MSC) or switch 18, a packet data serving node (PDSN) or internetworking function (IWF) 20, a public switched telephone network (PSTN) 22 (typically a telephone company), and an Internet Protocol (IP) network 24 (typically the Internet). For purposes of simplicity, four mobile stations 12a–12d, three base stations 14a–14c, one BSC 16, one MSC 18, and one PDSN 20 are shown. It would be understood by those skilled in the art that there could be any number of mobile stations 12, base stations 14, BSCs 16, MSCs 18, and PDSNs 20.

In one embodiment the wireless communication network 10 is a packet data services network. The mobile stations 12a–12d may be any of a number of different types of wireless communication device such as a portable phone, a cellular telephone that is connected to a laptop computer running IP-based, Web-browser applications, a cellular telephone with an associated hands-free car kit, a personal digital assistant (PDA) running IP-based, Web-browser applications, a wireless communication module incorporated into a portable computer, or a fixed location communication module such as might be found in a wireless local loop or meter reading system. In the most general embodiment, mobile stations may be any type of communication unit.

The mobile stations 12a–12d may advantageously be configured to perform one or more wireless packet data protocols such as described in, for example, the EIA/TIA/IS-707 standard. In a particular embodiment, the mobile stations 12a–12d generate IP packets destined for the IP network 24 and encapsulate the IP packets into frames using a point-to-point protocol (PPP).

In one embodiment the IP network 24 is coupled to the PDSN 20, the PDSN 20 is coupled to the MSC 18, the MSC 18 is coupled to the BSC 16 and the PSTN 22, and the BSC 16 is coupled to the base stations 14a–14c via wirelines configured for transmission of voice and/or data packets in accordance with any of several known protocols including, e.g., E1, T1, Asynchronous Transfer Mode (ATM), IP, PPP, Frame Relay, HDSL, ADSL, or xDSL. In an alternate embodiment, the BSC 16 is coupled directly to the PDSN 20, and the MSC 18 is not coupled to the PDSN 20. In another embodiment of the invention, the mobile stations 12a–12d communicate with the base stations 14a–14c over an RF interface defined in the $3^{rd}$ Generation Partnership Project 2 "3GPP2", "Physical Layer Standard for cdma2000 Spread Spectrum Systems," 3GPP2 Document No. C.P0002-A, TIA PN-4694, to be published as TIA/EIA/IS2000-2-A, (Draft, edit version 30) (Nov. 19, 1999), which is fully incorporated herein by reference.

During typical operation of the wireless communication network 10, the base stations 14a–14c receive and demodulate sets of reverse-link signals from various mobile stations 12a–12d engaged in telephone calls, Web browsing, or other data communications. Each reverse-link signal received by a given base station 14a–14c is processed within that base station 14a–14c. Each base station 14a–14c may communicate with a plurality of mobile stations 12a–12d by modulating and transmitting sets of forward-link signals to the mobile stations 12a–12d. For example, as shown in FIG. 1, the base station 14a communicates with first and second mobile stations 12a, 12b simultaneously, and the base station 14c communicates with third and fourth mobile stations 12c, 12d simultaneously. The resulting packets are forwarded to the BSC 16, which provides call resource allocation and mobility management functionality including the orchestration of soft handoffs of a call for a particular mobile station 12a–12d from one base station 14a–14c to another base station 14a–14c. For example, a mobile station 12c is communicating with two base stations 14b, 14c simultaneously. Eventually, when the mobile station 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

The wireless communication channel through which information signals travel from a mobile station 12 to a base station 14 is known as a reverse link. The wireless communication channel through which information signals travel from a base station 14 to a mobile station 12 is known as a forward link.

In an exemplary embodiment, a mobile station communicates with a base station using wideband code division multiple access (W-CDMA) techniques. W-CDMA is a recently proposed 3G communication system. One example of a W-CDMA system is described in the European Telecommunications Standards Institute (ETSI) Terrestrial Radio Access (UTRA) International Telecommunications Union (ITU) Radio Transmission Technology (RTT) Candidate Submission forwarded by ETSI to the ITU for consideration for the IMT-2000 CDMA standard. The base station s in a W-CDMA system operate asynchronously. That is, the W-CDMA base stations do not all share a common universal time reference. Different base stations are not time-aligned. Thus, although a W-CDMA base station has a pilot signal, a W-CDMA base station may not be identified by its pilot signal offset alone. Once the system time of one base station is determined, it cannot be used to estimate the system time of a neighboring base station . For this reason, mobiles in a W-CDMA system use a three-step PERCH acquisition procedure to synchronize with each base station in the system. Each step in the acquisition procedure identifies a different code within a frame structure called a PERCH channel. An industry standard for a wireless system using code division multiple access (CDMA) is set forth in the TIA/EIA Interim Standard entitled "Mobile station-Base Station Compatibility Standard for Dual-Mode Wideband Spread Spectrum Cellular System", TIA/EIA/IS-95, and its progeny (collectively referred to herein as IS-95), the contents of which are also incorporated herein by reference. More information concerning a code division multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both of which are assigned to the assignee of the present invention, and are incorporated in their entirety by reference herein.

Third-generation CDMA wireless communications systems have also been proposed. The cdma2000 ITU-R Radio Transmission Technology (RTT) Candidate Submission proposal forwarded by the Telecommunications Industry Association (TIA) to the International Telecommunication Union (ITU) for consideration for the IMT-2000 CDMA standard is an example of such a third-generation wireless communication system. The standard for cdma2000 is given in draft versions of IS-2000 and has been approved by the TIA. The cdma2000 proposal is compatible with IS-95 systems in many ways. For example, in both the cdma2000 and IS-95 systems, each base station time-synchronizes its operation with other base stations in the system. Typically, the base station synchronize operation to a universal time reference such as Global Positioning System (GPS) signaling; however, other mechanisms can be used. Based upon the synchronizing time reference, each base station in a given geographical area is assigned a sequence offset of a common pseudo noise (PN) pilot sequence. For example, according to IS-95, a PN sequence having $2^{15}$ chips and repeating every 26.67 milliseconds (ms) is transmitted as a pilot signal by each base station . The pilot PN sequence is transmitted by each base station at one of 512 possible PN sequence offsets. Each base station transmits the pilot signal continually, which enables mobile stations to identify the base station's transmissions as well as for other functions.

In an exemplary embodiment of the invention, a mobile station has a plurality of applications. The applications reside within the mobile station and each application produces a separate data stream. An application may produce more than one data stream.

Figure 2:
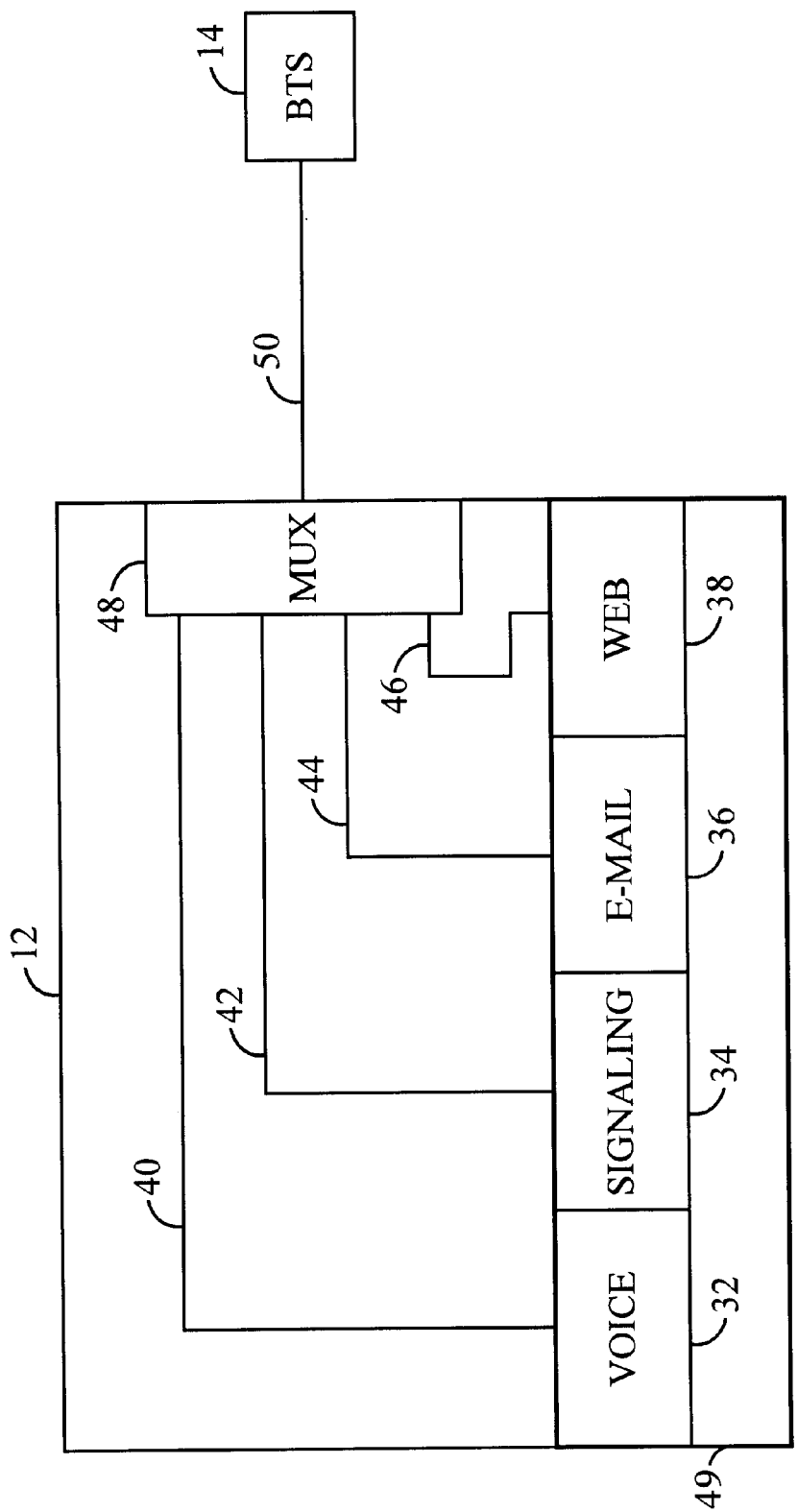
FIG. 2 shows a mobile station of an exemplary embodiment of the invention.

FIG. 2 shows a mobile station 12 of an exemplary embodiment of the invention. The mobile station 12 includes voice 32, signaling 34, E-mail 36 and web applications 38 residing in the memory 49 of the mobile station 12. Each application, voice 32, signalling 34, E-mail 36 and web application 38 produces a separate data stream 40, 42, 44, 46, respectively. The data streams are combined by a multiplexer module 48 into one data stream called the transport stream 50. The transport stream 50 is sent over the reverse link to a base transceiver station 14 (BTS), also called a base station for short.

The multiplexer module 48 combines the data streams 40–46 onto the transport stream 50 according to their relative proportions and priorities. Each data stream 40–46 has a proportion value and a priority. The proportion value determines the proportion of the transport stream 50 that the data stream 40–46 is scheduled to occupy. The priority determines which data stream 40–46 will provide a packet to the multiplexer module 48 when the scheduled data stream 40–46 is empty. Initially, the relative proportions of the data streams are used to schedule frames from the data streams 40–46 to be sent over the reverse link. If a frame is scheduled from a data stream 40–46 that is empty, then a frame is taken from the highest priority non-null data stream 40–46 to be sent over the reverse link.

Each data stream 40–46 has a proportion value that determines the proportion of the transport stream 50 that the data stream 40–46 is scheduled to occupy. If a data stream 40–46 is empty, then the multiplexer module 48 uses the priorities of the data streams 40–46 to determine where to get the next frame. The multiplexer module 48 gets the next frame from the highest priority non-null data stream 40–46.

The data stream proportions determines the mapping of the data streams onto the transport stream. The mapping determines where the multiplexer module 48 will initially look to get a frame. In one embodiment of the invention, the mapping is established in real-time, i.e., when an application is producing a data stream for the multiplexer module 48 to process. In another embodiment of the invention, the mapping can be established before an application produces a data stream for the multiplexer module 48 to process. As would be apparent to one of ordinary skill in the art, the mapping does not have to be real-time. For example, the mapping can be done at compile time. That is, an algorithm to do the mapping can be compiled off-line.

Once a mapping table (not shown) is created, the mapping table can then be advantageously traversed repeatedly during frame transmissions, so that each mapping table element determines which data stream frame should be sent in the transport frame slot corresponding to the mapping table element.

In yet another embodiment of the invention, a mapping algorithm is executed continuously when sending frames onto the transport stream 50. The advantage of continuously executing the mapping algorithm is that the mapping algorithm can be enhanced to quickly adapt to changes in the number and the proportional mix of the data streams 40–46 without disturbing the data stream distribution statistically. However, this algorithmic usage is less efficient than the table method when the number and proportionality of the data streams 40–46 do not change often compared to the transport frame rate.

The priorities of the data streams 40–46 matter only when a frame is scheduled to come from a data stream 40–46 that is empty/null, i.e., when an application does not produce any more frames. If a data stream 40–46 does not have any frame to be sent, its frame slots are used to send frames from the highest priority data stream 40–46 among the data streams 40–46 that have frames to be sent. That is, when a frame is schedule to come from an empty data stream 40–46, the multiplexer module 48 takes the next frame from the highest priority non-null data stream 40–46.

In an exemplary embodiment of the invention, the multiplexer module 48 operates within the media-access control (MAC) layer and gets the proportion values and data stream priorities from a higher network layer. As would be apparent to one of ordinary skill in the art, the data streams 40–46 can be prioritized with any priority scheme known in the art, such as first-in-first-out (FIFO), last-in-first-out (LIFO), and shortest-job-first (SJF). As would be apparent to one of ordinary skill in the art, the multiplexer module 48 can operate on a plurality of network levels.

In another embodiment of the invention, the multiplexer module 48 is executed in hardware. In yet another embodiment of the invention, the multiplexer module 48 is executed in a combination of software and hardware. As would be apparent to one of ordinary skill in the art, the multiplexer module 48 can be executed by any combination of software and hardware.

The mapping algorithm creates a map table that specifies a scheduling sequence the multiplexer module 48 uses to schedule frames from the data streams 40–46. Each data stream 40–46 is scheduled to provide frames to the multiplexer module 48.

If each data stream 40–46 is non-null, i.e., not empty, then each data steam 40–46 will occupy its relative proportion of the transport stream 50. Let p1, p2, . . . , pn be the relative proportions taken by n data streams 40–46 sharing the same transport stream 50, then for every p1 frames from data stream 1, there are p2 frames from data stream 2, and p3 frames from data stream 3, . . . , and pn frames from data stream n.

If there are three non-null data streams 40–46, then data stream 1 will occupy p1/(p1+p2+p3) of the transport stream 50, where pn is the proportion value of data stream n. For example, given non-null data streams 40–46, a data stream 1, a data stream 2, and a data stream 3, where data stream 1 has a proportion value of 5 (p1=5;), data stream 2 has a proportion value of 3 (p2=3), and data stream 3 has a proportion value of 2 (p3=2), then data stream 1 will occupy 5/10 of the transport stream 50, data stream 2 will occupy 3/10 of the transport stream and data stream 3 will occupy 2/10 of the transport stream 50. The length of the map table is p1+p2+p3, which in this example is 10 frames long.

The map table is an array of numerals representing the number of the data stream 40–46 that is scheduled to provide a frame to the multiplexer module 48. Each array is a mapping of the data stream frames onto the transport stream 50. The map table [1,2,3,1,2,1,3,1,2,1] means that the first frame is scheduled to be sent from data stream 1, the second frame is scheduled to be sent from data stream 2, the third frame is scheduled to be sent from data stream 3, the fourth frame is scheduled to be sent from data stream 1, the fifth frame is scheduled to be sent from data stream 2, the sixth frame is scheduled to be sent from data stream 1, the seventh frame is scheduled to be sent from data stream 3, the eighth frame is scheduled to be sent from data stream 1, the ninth frame is scheduled to be sent from data stream 2, and the tenth frame is scheduled to be sent from data stream 1.

The mapping algorithm multiplexes multiple streams 40–46 of data frames onto one transport stream 50 so that the frames from each stream 40–46 are distributed uniformly. That is, the frames in each stream 40–46 are distributed uniformly across the transport stream 50. Thus, given a 3-data-stream situation with p1=5, p2=3, and p3=2, then, in every ten transport frames, there are five frames in stream 1, three frames in stream 2, and two frames in stream 3, and the frames belonging to each stream 40–46 are distributed uniformly on the transport stream 50.

Although the multiplexer module 48 places data stream frames onto the transport stream 50 in a uniform fashion, there may be more than one way to fairly distribute multiple data streams 40–46 onto one transport stream 50. Thus, with p1=5, p2=3, and p3=2, the first 10 frames sent on the transport stream 50 can be [1,2,3,1,2,1,3,1,2,1], or [1,3,2,1, 2,1,3,1,2,1], or [2,1,3,1,2,1,3,1,2,1], or [2,3,1,1,2,1,3,1,2,1], or [3,1,2,1,2,1,3,1,2,1], or [3,2,1,1,2,1,3,1,2,1] where each numeral in an array represents the data stream number. The left number in the array represents the first frame sent. The mapping algorithm can advantagously be modified to produce any sequence satisfying the fair distribution requirement.

Once the mapping table is determined, the multiplexer module 48 uses the mapping table to schedule frames from the data streams 40–46 and continues to repeat the mapping table sequence as long as there are frames in a data stream 40–46 to be sent over the reverse link.

The mapping algorithm is a "bucket" approach to multiplexing data streams 40–46 onto a single stream. Each data stream 40–46 is represented by a "bucket." When a bucket is filled, the represented data stream 40–46 can be scheduled to provide a frame.

The proportion values of the data streams 40–46 determine the depths of the data stream buckets. Each data steam bucket has a depth inversely proportional to its proportion value. Each bucket has a fill rate based on the bucket's proportion value. The fill rate is the rate at which the bucket is filled. The level within each bucket is incremented at its fill rate for every frame step. Only when a data stream bucket is full can a frame be scheduled to be taken from the data stream bucket by the multiplexer module 48.

In an exemplary embodiment of the invention, a mapping algorithm is as shown below in pseudo-code. In alternate embodiments of the invention, the initial values of the $S_i$s and the $D_i$s are changed to change the sequence of the data streams 40–46 in the mapping table.

$p_1, p_2, \ldots, p_n$ are the relative proportions of n data streams.
Let Product be [n*LeastCommonMultiple(p1,p2, . . . ,pn)].
(The LeastCommonMultiple of p1,p2, . . . ,pn can be replaced by the product of $p_1,p_2, \ldots, p_n$ without affecting the correctness of the algorithm.)
Let $q(1)=Product/p_1, q(2)=Product/p_2, \ldots, q(n)=Product/p_n$.
Let L be a list with n elements, where each of its elements has two fields: S and D.
Let $S_i$ denote the value of the S field of the i-th element in the list, and let $D_i$ denote the value of the D field of the i-th element in the list. The first element in the list is called the head of the list.
Comment: S represents streams, D represents depth
Set the initial values of the $S_i$s: $S_1=1, S_2=2, \ldots, S_n=n$.

Set the initial values of the $D_i$s: $D_1=1, D_2=1, \ldots, D_n=1$.
During each transport frame slot:
  (a) Transmit a frame from the data stream identified by $S_1$.
    If $D_2 \geq q(S_1)$, change $D_2$ to $D_2-q(S_1)$, wait for the next transport frame slot.
    Else change $D_1$ to $q(S_1)-D_2$, temporarily remove the head element from the list, index the remaining elements in ascending order as $i=1, 2, \ldots$, respectively (The previous i+1th element becomes the new ith element; for example, the previous $2^{nd}$ element has become the new head element and the $3^{rd}$ element has become the new second element), and insert the removed element back into the list as follows:

```
{   Let Dx be the D field of the element to be re-inserted.
    Start with the i=2 element.
    Block Traverse the list L:
    {   If there is no more list element (i≧ n):
        {
            Insert the removed element as the nth element;
            Terminate the list traversal;
        }
        else
        (
            If Dx > Di:
            {
                Change Dx to Dx-Di;
                Move on to the next element (i=i+1);
            }
            else:
            {
                Change Di to Di-Dx;
                Insert the removed element before the i-th
            element;
                ((The previous i-th element has become the
                new (i+1)th element.))
                Terminate the list traversal;
            }
        }
    }
    Wait for the next transport frame slot;
}
```

Figure 4:
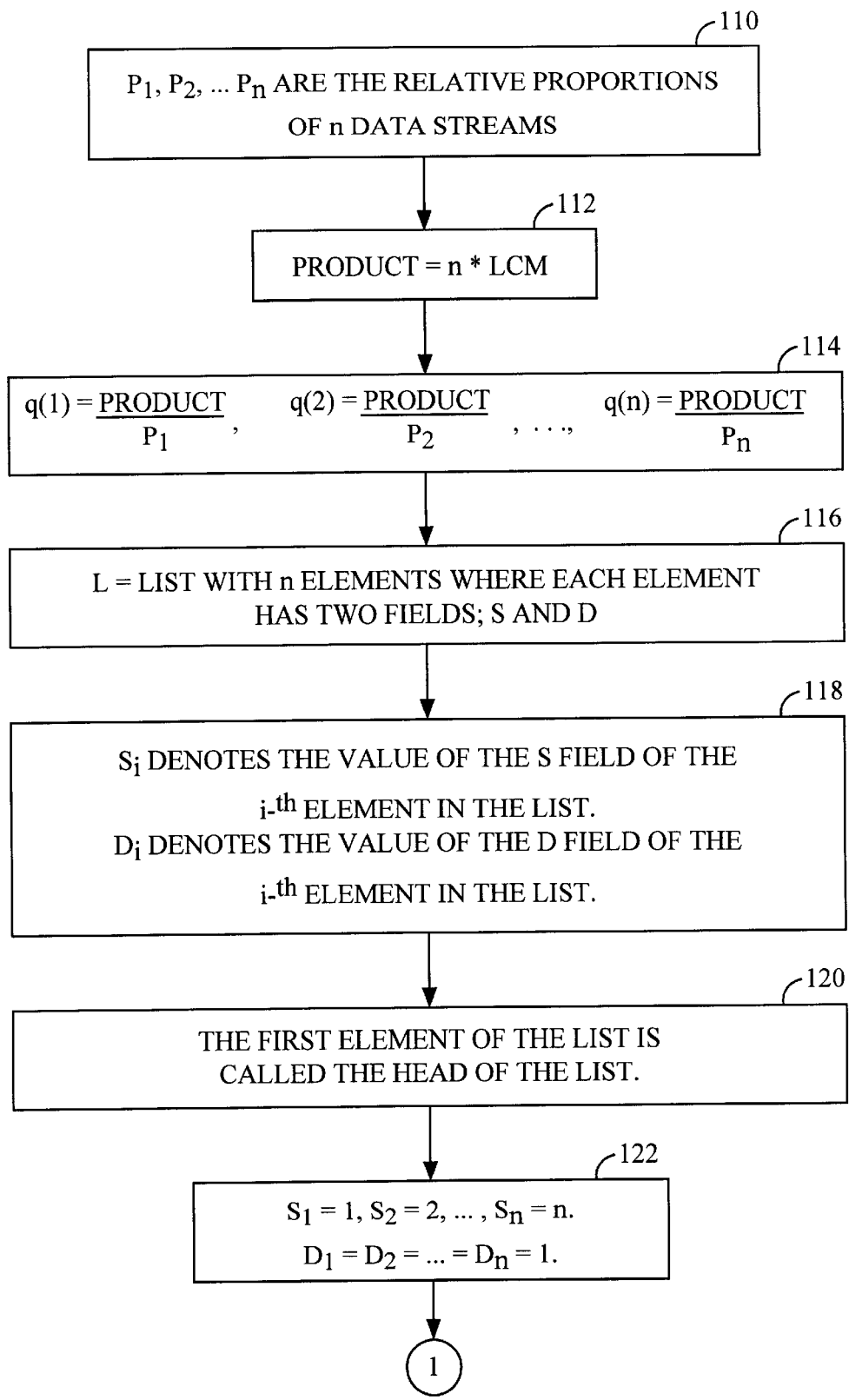
FIG. 4 shows the initialization of a mapping algorithm in flowchart form.
Figure 5:
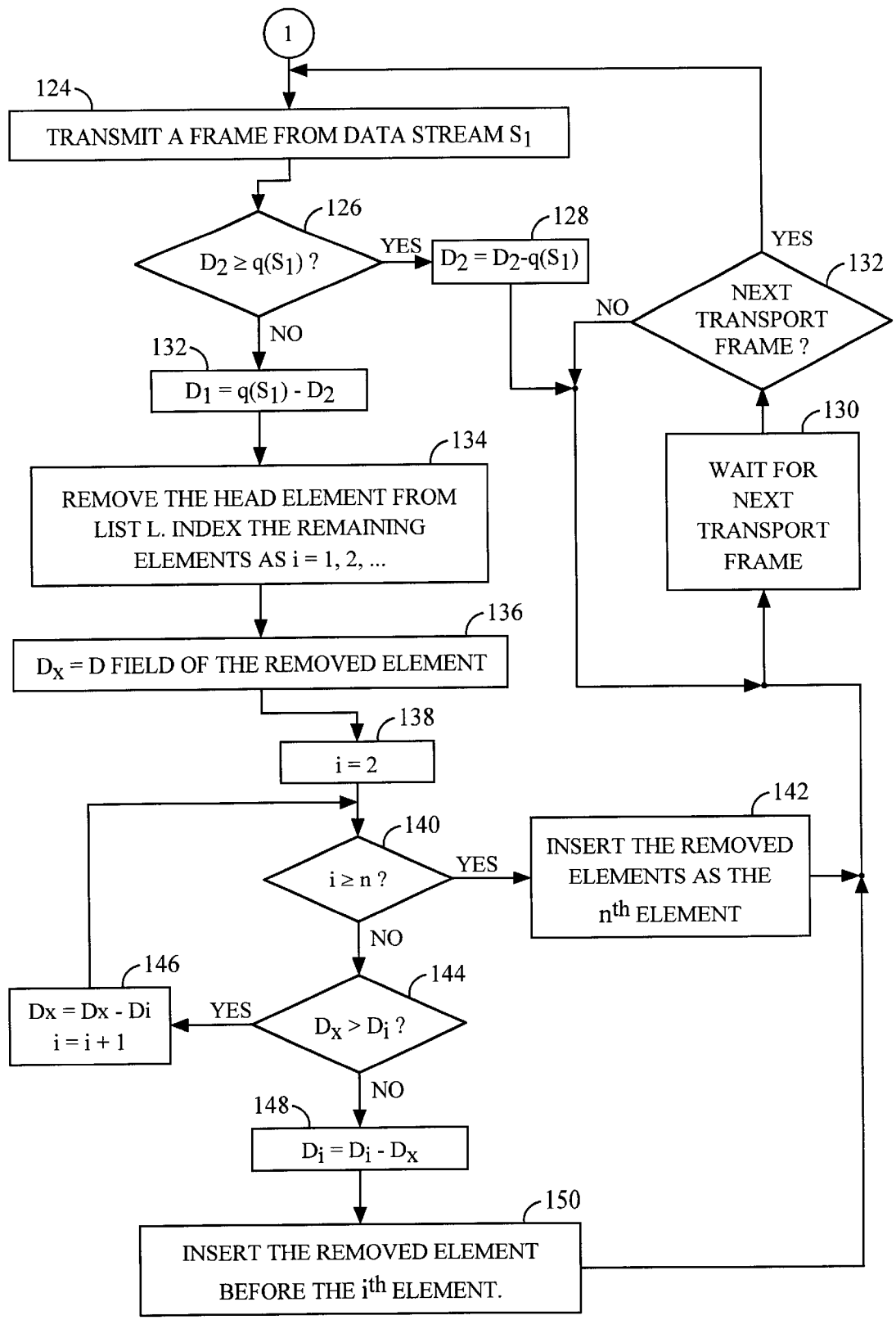
FIG. 5 shows the body of a mapping algorithm in flowchart form.

FIGS. 4–5 show a flowchart of the mapping algorithm in an exemplary embodiment of the invention. FIG. 4 shows the initialization of the mapping algorithm.

$p_1, \ldots, p_2, p_n$ are the relative proportions of data streams 1-$n$, respectively 110. In one embodiment of the invention, Product is set to n* LeastCommonMultiple(p1,p2, . . . ,pn) 112. In an alternative embodiment, LeastCommonMultiple (p1,p2, . . . ,pn) is set to the product of $p_1, p_2, \ldots, p_n$.

$q(1)$ is set to Product/$p_1$, $q(2)$ is set to Product/$p_2, \ldots$, and $q(n)$ is set to Product/$p_n$ 114. A list L is created with n elements, where each element has two fields: S and D 116. $S_i$ denotes the value of the S field of the i-th element in the list, and $D_i$ denote the value of the D field of the i-th element in the list 118. The first element in the list is the head of the list 120.

$S_1$ is set to 1, $S_2$ is set to 2, . . . , and $S_n$ is set to n. The S field represents the stream number. $D_1$ is set to 1, $D_2$ is set to1, . . . , and $D_n$ is set to1. The D field represents the depth of a stream 122.

A frame is transmitted from the data stream identified by $S_1$ 124. If $D_2 \geq q(S_1)$ 126, then $D_2$ is set to $D_2-q(S_1)$ 128 and the algorithm waits for the next transport frame slot 130. If $D_2 < q(S_1)$ 126, then $D_1$ is set to $q(S_1)-D_2$ 132, then the head element is temporarily removed from the list and the remaining elements in the list are renumbered in ascending order as i=1, 2, . . . , respectively 134. That is, the previous i+1th element becomes the new ith element; for example, the previous $2^{nd}$ element has become the new head element and the $3^{rd}$ element has become the new second element.

$D_x$ is the D field of the removed element to be re-inserted 136. i is set to 2 138. If there is no more list element (i≧n) 140, then the removed element is inserted as the nth element 142 and the algorithm waits for the next transport frame 130. If i is not ≧n 140, then $D_x$ is compared to $D_i$ 144. If $D_x > D_i$ then $D_x$ is set to $D_x-D_i$ and move on to the next element in the list, that is, i is incremented(i=i+1) 146. If $D_x$ is not >$D_i$, then $D_i$ is set to $D_i-D_x$ 148 and the removed element is inserted before the i-th element 150. The algorithm waits for the next transport frame slot 130.

When it is time for the next transport frame slot, i.e., when the next transport frame condition is true 132, a frame is transmitted 124 from data stream $S_1$ to the transport stream 50.

Figure 3:
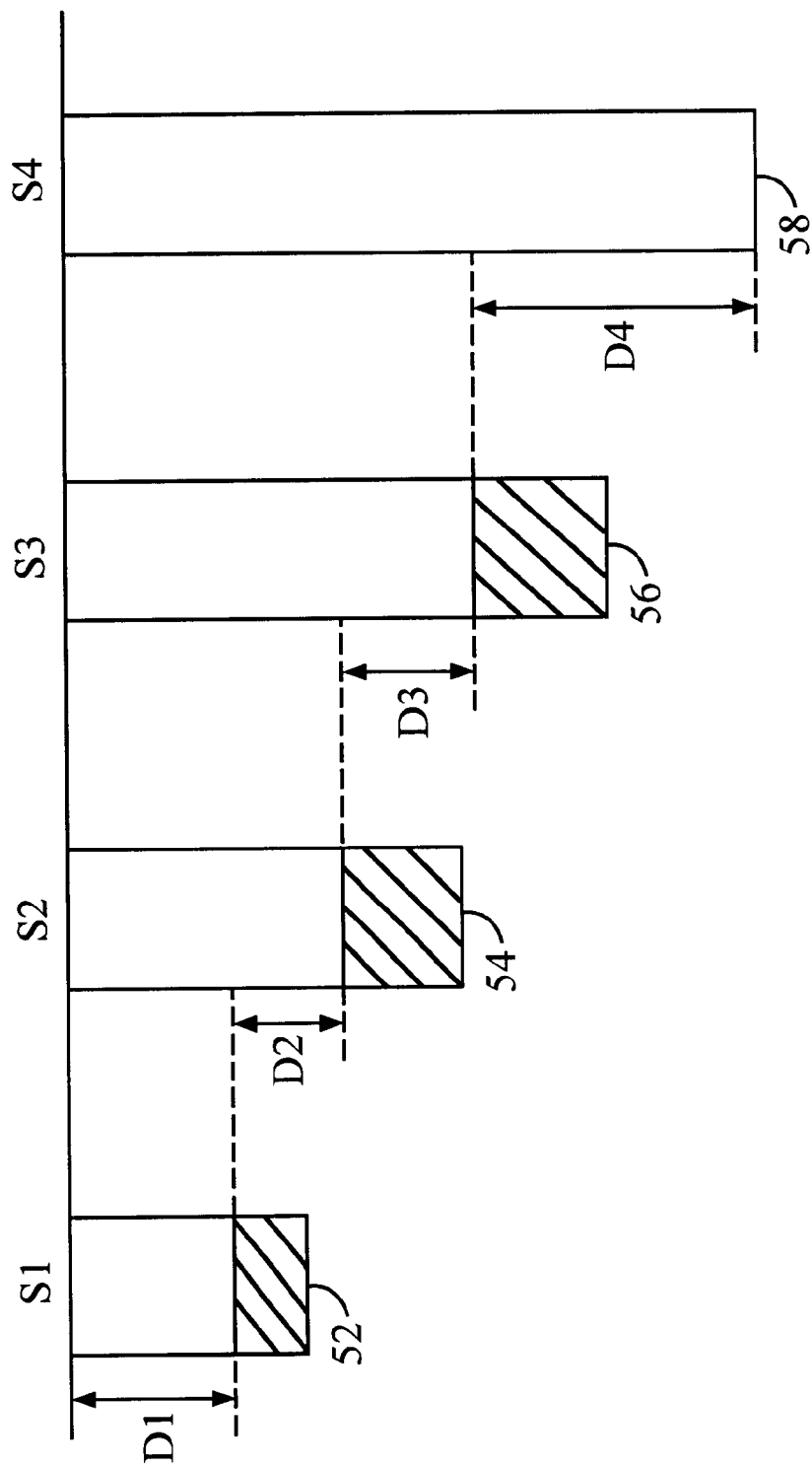
FIG. 3 shows four buckets for four data streams.

Each list element represents a bucket for a data stream identified by the S field. The depth of the bucket is the "q" value of the data stream, which is inversely proportional to the data stream proportion value. All the buckets are incremented every transport frame slot. When a bucket is filled to the top, a frame in the corresponding data stream is scheduled to be sent, and the bucket restarts from empty. In the list L, the buckets are ordered according to the amounts left to fill them, in ascending order. The D field gives the difference between the amount left to fill for the current bucket and the amount left to fill for the preceding bucket. This is illustrated in FIG. 3 where there are four buckets for four data streams. Buckets S1 52, S2 54, and S3 56 are partially filled and bucket S4 58 is empty. As would be apparent to one of ordinary skill in the art, the mapping algorithm may advantageously be maintained in memory, software, hardware, or any combination thereof, in accordance with one embodiment.

A trace of the mapping algorithm given $p_1=1, p_2=2, p_3=3$, is shown below.
  Product=n*LCM=3*6=18.
  q(1)=18/1=18
  q(2)=18/2=9
  q(3)=18/3=6

Figure 6:
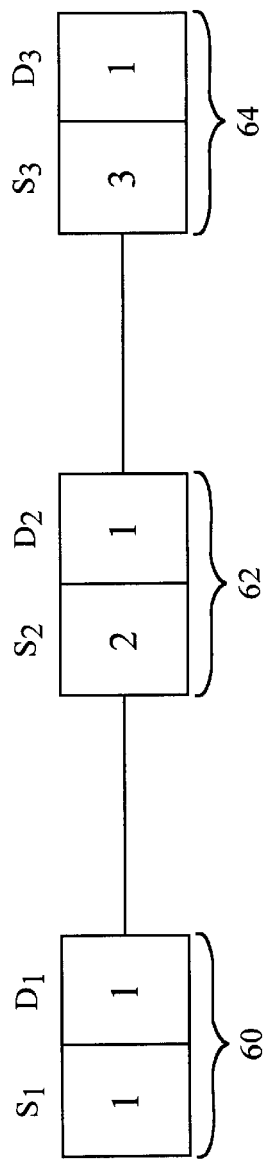
FIG. 6 shows a list when initialized.

FIG. 6 shows the list when initialized. 1-1 60 is the head of the list. 2-1 62 is the second element. 3-1 64 is the third element.

Figure 7:
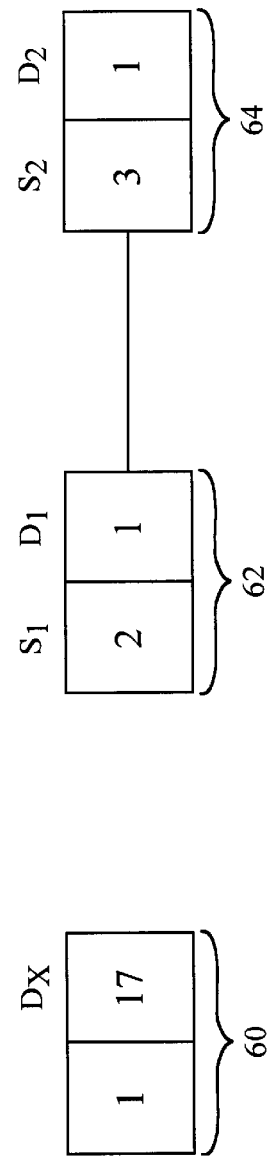
FIG. 7 shows a head element being removed from the list.

Since $S_1$ is 1, a frame from data stream 1 is transmitted. $D_2=1$, which is less than $q(S_1)$ since q(1)=18, therefore $D_1$ is changed to $q(S_1)-D_2=18-1=17$. The head element 60 is removed from the list as shown in FIG. 7 and the $D_x$ field is the D field of the removed head element. Now i=1 refers to the new head element 2-1 and i=2 refers to the new second element 3-1.

Figure 8:
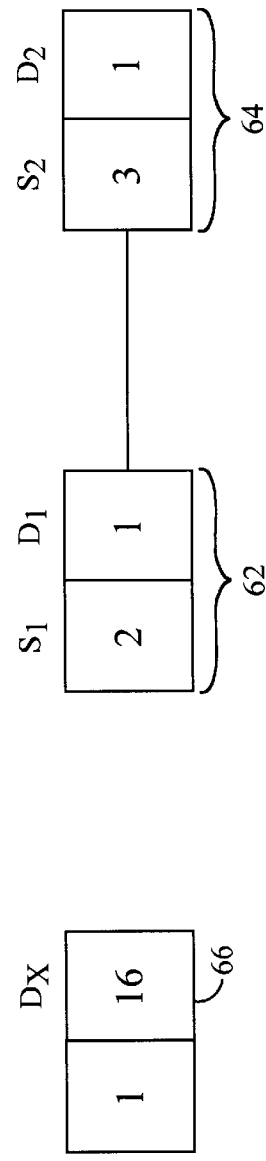
FIG. 8 shows $D_x$ after being changed.

Now i=2 and the list will be traversed. Since i=2 is not greater than or equal to n=3, $D_x$ is compared to $D_i$. Since $D_x=17$ is greater than $D_i=D_2=1$, $D_x$ 66 is changed to $D_x-D_i=17-1=16$ as shown in FIG. 8.

Figure 9:
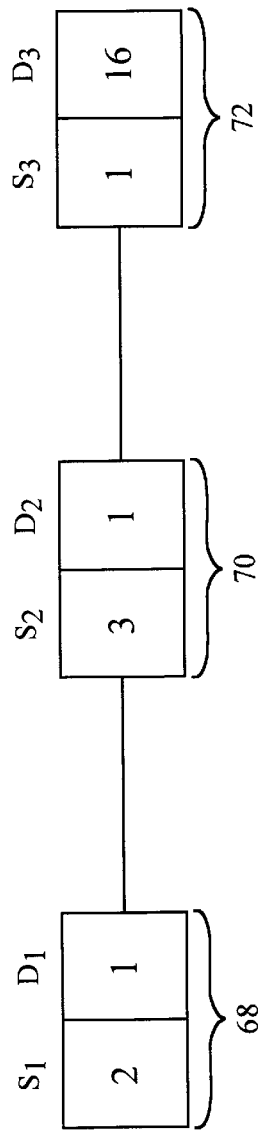
FIG. 9 shows a removed element inserted as the n=3 element.

The flow of the algorithm then moves on to the next element in the list by incrementing i and going back up to the Traverse-the-list block. Now i=3, which equals n=3, therefore the removed element is inserted as the n=3 element as shown in FIG. 9 and the list traversal is terminated. The head element is 2-1 68. The second element is 3-1 70. The third element is 1-16 72.

The algorithm then waits for the next transport frame slot. Then during the transport frame slot, the frame from the data stream identified by $S_1$ is transmitted. Since $S_1$ is 2, a frame from data stream 2 is transmitted. Thus, the mapping table at this point is [1,2], which means that a frame from data stream 1 will be sent first and a frame from data stream 2 will be sent second.

Figure 10:
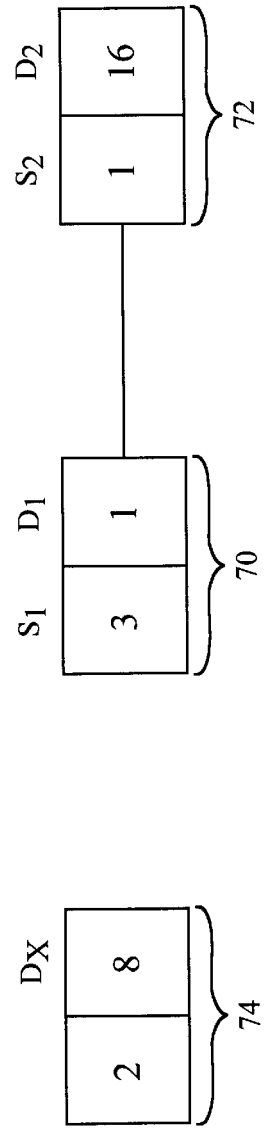
FIG. 10 shows a head element removed from the list.

Now $D_2=1$, which is less than $q(S_1)$ since $q(2)=9$, therefore $D_1$ is changed to $q(S_1)-D_2=9-1=8$. The head element 74 is removed from the list as shown in FIG. 10 and the $D_x$ field is the D field of the removed head element. Now i=1 refers to the new head element 2-8 and i=2 refers to the new second element 1-16.

Figure 11:
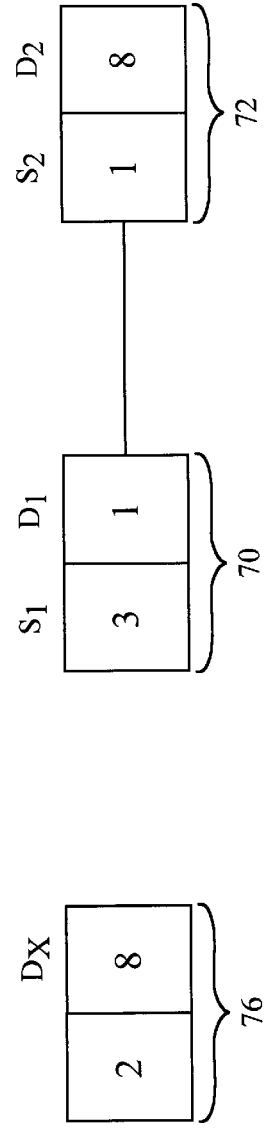
FIG. 11 shows $D_i$ after being changed.

Now i=2 and the list will be traversed. Since i=2 is not greater than or equal to n=3, $D_x$ is compared to $D_i$. Since $D_x=8$ is not greater than $D_i=D_2=16$, $D_i$ is $D_i-D_x=16-8=8$ as shown in FIG. 11. The head element is 2-8 76 again. The removed element is inserted before the i-th element as shown in FIG. 12 and the list traversal is terminated. The head element is now 3-1 78. The second element is 2-8 80. The third element is 1-8 82.

The algorithm then waits for the next transport frame slot. Then during the transport frame slot, the frame from the data stream identified by $S_1$ is transmitted. Since $S_1$ is 3, a frame from data stream 3 is transmitted. Thus, the mapping table at this point is [1,2,3], which stands for data stream 1, data stream 2 and data stream 3, and is the order with which frames from that data streams shall be sent.

Now $D_2=8$, which is greater than than $q(S_1)$ since $q(3)=6$, therefore $D_2$ is changed to $D_2-q(S_1)=8-6=2$ 84 as shown in FIG. 13. The algorithm then waits for the next transport frame slot. Then during the transport frame slot, the frame from the data stream identified by $S_1$ is transmitted. Since $S_1$ is 3, a frame from data stream 3 is transmitted. Thus, the mapping table at this point is [1,2,3,3].

Now $D_2=2$, which is less than $q(S_1)$ since $q(3)=6$, therefore $D_1$ is changed to $q(S_1)-D_2=6-2=4$. The head element 86 is removed from the list as shown in FIG. 14 and the $D_x$ field is the D field of the removed head element. Now i=1 refers to the new head element 2-2 84 and i=2 refers to the new second element 1-8 82.

Figure 15:
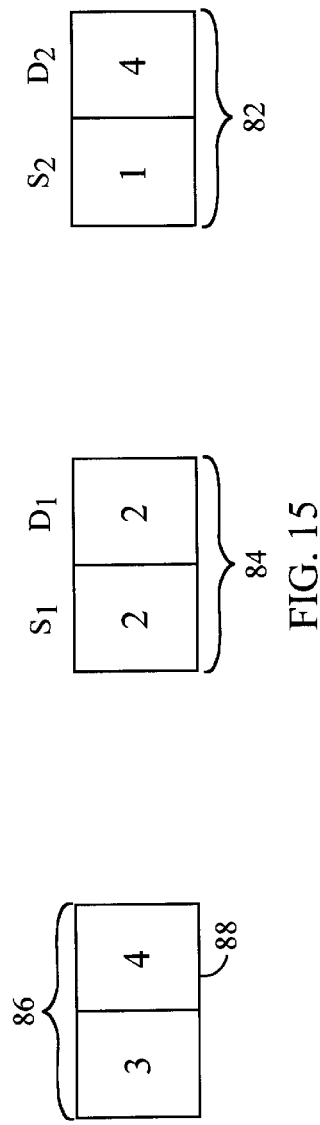
FIG. 15 shows $D_i$ after being changed.
Figure 16:
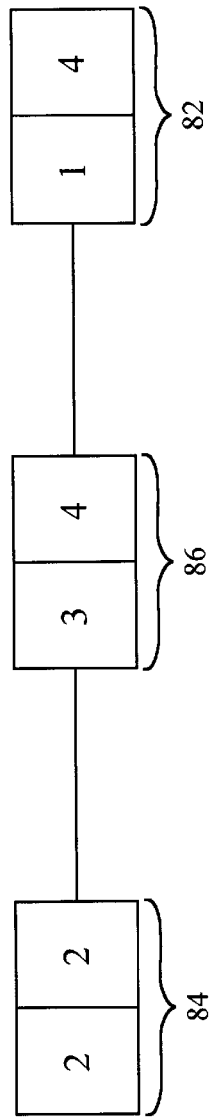
FIG. 16 shows the removed element inserted before the i-th element.

Now i=2 and the list will be traversed. Since i=2 is not greater than or equal to n=3, $D_x$ is compared to $D_i$. Since $D_x=4$ is not greater than $D_i=D_2=8$, $D_i$ is changed to $D_i-D_x=8-4=4$ 88 as shown in FIG. 15. The removed element 86 is inserted before the i-th element as shown in FIG. 16 and the list traversal is terminated.

The algorithm then waits for the next transport frame slot. Then during the transport frame slot, the frame from the data stream identified by $S_1$ is transmitted. Since $S_1$ is 2, a frame from data stream 2 is transmitted. Thus, the mapping table at this point is [1,2,3,3,2].

Figure 17:
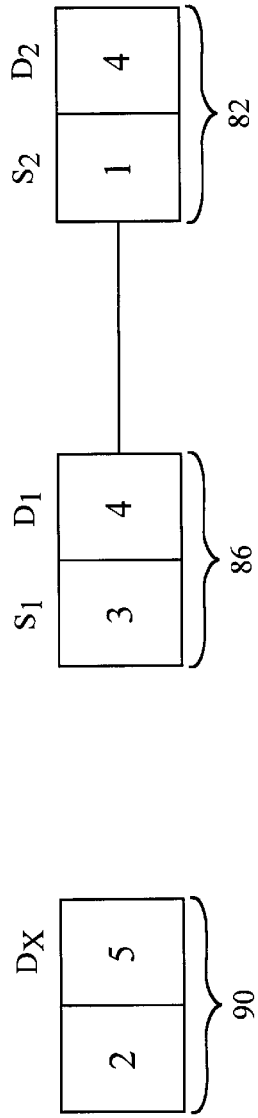
FIG. 17 shows the head element removed from the list.

Now $D_2=4$, which is less than $q(S_1)$ since $q(2)=9$, therefore $D_1$ is changed to $q(S_1)-D_2=9-4=5$. The head element 90 is removed from the list as shown in FIG. 17 and the $D_x$ field is the D field of the removed head element. Now i=1 refers to the new head element 2-5 and i=2 refers to the new second element 1-4.

Now i=2 and the list will be traversed. Since i=2 is not greater than or equal to n=3, $D_x$ is compared to $D_i$. Since $D_x=5$ is greater than $D_i=D_2=4$, $D_x$ 92 is changed to $D_x-D_1=5-4=1$ as shown in FIG. 18. The flow of the algorithm then moves on to the next element in the list by incrementing i and going back up to the Traverse-the-list block. Now i=3, which equals n=3, therefore the removed element is inserted as the n=3 element 94 as shown in FIG. 19 and the list traversal is terminated.

The algorithm then waits for the next transport frame slot. Then during the transport frame slot, the frame from the data stream identified by $S_1$ is transmitted. Since $S_1$ is 3, a frame from data stream 3 is transmitted. Thus, the mapping table at this point is [1,2,3,3,2,3], which is the final mapping table because it is length p1+p2+p3.

The mapping table is used to schedule frames from the data streams. If the mapping algorithm is continuously run, then it will continually produce the sequence [1,2,3,3,2,3]. To show that this is true, the trace of the algorithm is shown for two more frames, in which case a list pattern is shown to repeat itself.

Now $D_2=4$, which is less than $q(S_1)$ since $q(3)=6$, therefore $D_1$ is changed to $q(S_1)-D_2=6-4=2$. The head element 96 is removed from the list as shown in FIG. 20 and the $D_x$ field is the D field of the removed head element. Now i=1 refers to the new head element 1-4 and i=2 refers to the new second element 2-1.

Now i=2 and the list will be traversed. Since i=2 is not greater than or equal to n=3, $D_x$ is compared to $D_i$. Since $D_x=2$ is greater than $D_i=D_2=1$, $D_x$ 98 is changed to $D_x-D_i=2-1=1$ as shown in FIG. 21. The flow of the algorithm then moves on to the next element in the list by incrementing i and going back up to the Traverse-the-list block. Now i=3, which equals n=3, therefore the removed element is inserted as the n=3 element 100 as shown in FIG. 22 and the list traversal is terminated.

The algorithm then waits for the next transport frame slot. Then during the transport frame slot, the frame from the data stream identified by $S_1$ is transmitted. Since $S_1$ is 1, a frame from data stream 1 is transmitted.

Now $D_2=1$, which is less than $q(S_1)$ since $q(1)=18$, therefore $D_1$ is changed to $q(S_1)-D_2=18-1=17$. The head element 102 is removed from the list as shown in FIG. 23 and the $D_x$ field is the D field of the removed head element. Now i=1 refers to the new head element 2-1 and i=2 refers to the new second element 3-1.

Figure 24:
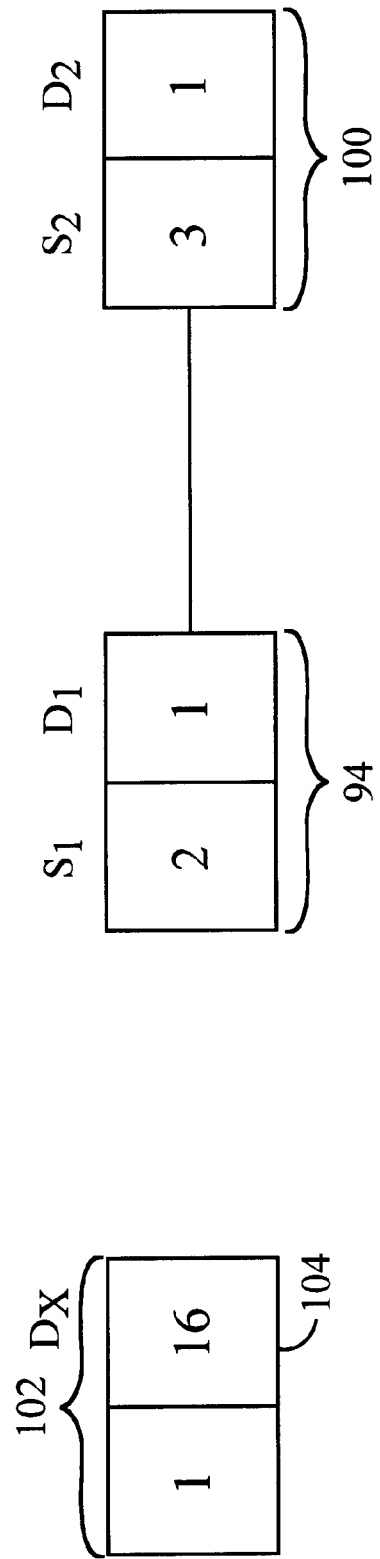
FIG. 24 shows $D_x$ after being changed.
Figure 25:
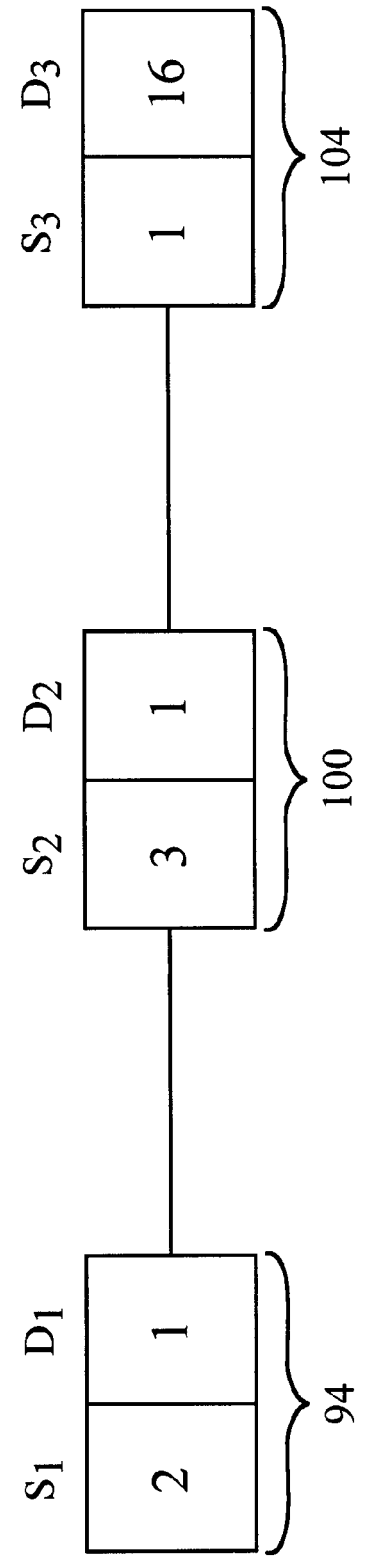
FIG. 25 shows the removed element inserted as the n=3 element.

Now i=2 and the list will be traversed. Since i=2 is not greater than or equal to n=3, $D_x$ is compared to $D_i$. Since $D_x=17$ is greater than $D_i=D_2=1$, $D_x$ 104 is changed to $D_x-D_i=17-1=16$ as shown in FIG. 24. The flow of the algorithm then moves on to the next element in the list by incrementing i and going back up to the Traverse-the-list block. Now i=3, which equals n=3, therefore the removed element is inserted as the n=3 106 element as shown in FIG. 25 and the list traversal is terminated.

The algorithm then waits for the next transport frame slot. Then during the transport frame slot, the frame from the data stream identified by $S_1$ is transmitted. Since $S_1$ is 2, a frame from data stream 2 is transmitted.

After the sequence [1,2,3,3,2,3] was transmitted, frames from data stream 1 and data stream 2 were transmitted. FIG. 25 is the same as FIG. 9, which shows that the algorithm will continue to repeat the sequence.

In other embodiments of the invention, the algorithm may be started with different initial values for the $S_i$s and the other five sequences given for the $p_1=5$, $p_2=3$, $p_3=2$ example are generated. For example, for $S_1=2$, $S_2=3$, $S_3=1$, the sequence [2,1,3,1,2,1,3,1,2,1] is generated. In still other embodiments of the invention, the initial values of $D_i$s may be modified to generate different sequences.

In one embodiment of the invention, packets instead of frames advantageously are multiplexed from multiple data streams into one data stream.

In yet another embodiment of the invention, the algorithm is optimized to let multiple data streams with the same proportion value share one list element so that there are a number m of unique proportion values even though there may be more than m data streams (i.e., m<n). Then, the "n" in the algorithm should be replaced by "m" so that all the $p_i$s are unique and the S field of the algorithm represents a set of data streams sharing the same proportion value. In addition, the pseudo-code "Transmit a frame from the data stream identified by $S_1$" of the algorithm on p. 14 is replaced by "Transmit a frame from each of the data streams contained in the set $S_1$. " The $q(S_1)$ value represents Product/px, where px is the proportion value shared by the data streams in the set S1. This optimization improves algorithm efficiency.

In an alternative embodiment of the invention, a mapping algorithm employing same size buckets, but different fill rates are used. As would be apparent to one of ordinary skill in the art, the disclosed mapping algorithm can be rewritten such that the buckets have the same size, but the fill rates are inversely related to the bucket sizes and are based on the proportion values of the respective data streams.

In an alternative embodiment of the invention, when there are only two data streams, the above algorithm is advantageously replaced by the following simpler one. If $p_1$ is a multiple of p2, a mapping algorithm in accordance with this embodiment is shown in pseudo-code as follows:

Initialize the following variables:

SkipBase=$P_1/p_2$, where "/" represents integer division.

InitialFraction=$p_1\%p_2$, where "%" represents modulo operation.

SkipCount=0;

FractionCount=0;

During each transport frame slot:

```
        if (SkipCount == 0)
        {
            Transmit a frame from data stream #2;
(a)         FractionCount = FractionCount + InitialFraction;
            if (FractionCount >= p₂)
            {
                SkipCount = SkipBase + 1;
                FractionCount = FractionCount - p₂;
            }
(b)         else
            {
                SkipCount = SkipBase;
            }
        }
        else
        {
            Transmit a frame from data stream #1;
            SkipCount = SkipCount - 1;
        }
```

As would be apparent to one of ordinary skill in the art, the mapping algorithm can be applied to other interconnections between network modules. It can be applied to any situation where a module has a plurality of inputs and produces a multiplexed ouput from the plurality of inputs. For example, a multiplexer module can be located within a BTS wherein the BTS multiplexes data streams from a plurality of mobile stations and produces a multiplexed data stream to be sent to the BSC.

Thus, a novel and improved method and apparatus for multiplexing multiple data streams onto one data stream have been described. Those of skill in the art would understand that the various illustrative logical blocks, modules, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, and algorithm steps described in connection with the embodiments disclosed herein may be implemented or performed with a processor executing a set of firmware instructions, an application specific integrated circuit (ASIC), a field programmable gate array (FPGA) or other programmable logic device, discrete gate or transistor logic, discrete hardware components such as, e.g., registers, any conventional programmable software module and a processor, or any combination thereof designed to perform the functions described herein. The multiplexer may advantageously be a microprocessor, but in the alternative, the multiplexer may be any conventional processor, controller, microcontroller, or state machine. The applications could reside in RAM memory, flash memory, ROM memory, EPROM memory, EEPROM memory, registers, hard disk, a removable disk, a CD-ROM, or any other form of storage medium known in the art. As illustrated in FIG. 2, a base station 14 is advantageously coupled to a mobile station 12 so as to read information from the base station 14. The memory 49 may be integral to the multiplexer 48. The multiplexer 48 and memory 49 may reside in an ASIC (not shown). The ASIC may reside in a telephone 12.

The previous description of the embodiments of the invention is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for multiplexing a plurality of data streams onto one data stream comprising:

creating a list of queues, each queue representing a data stream and having a length inversely related to a proportion value of the data stream, wherein each data stream comprises at least one frame;

incrementing at each frame each queue by the inverse of the proportion value;

creating an array of length equal to the sum of all queue lengths;

inserting into the array, until the array is filled, an identifier of the data stream corresponding to a filled queue; and emptying the filled queue.

2. The method of claim 1, further comprising continually looping through the array and transmitting a frame from the data stream corresponding to the identifier at the head of the array.

3. The method of claim 1, further comprising looping through the array when a frame is due to be sent and transmitting the frame from the data stream corresponding to the identifier at the head of the array.

4. A wireless communication system, comprising:

a subscriber unit having a plurality of applications residing in a memory and a multiplexer, each application producing a data stream as input to the multiplexer, wherein each data stream comprises at least one frame, and the multiplexer uniformly distributes frames from the data streams onto a single stream based on the data streams' proportion value;

a base station coupled to the subscriber unit and configured to receive the single stream; and a base station controller coupled to a base station.

5. A method for multiplexing a plurality of data streams onto one data stream comprising:

means for creating a list of queues, each queue representing a data stream and having a length inversely related to a proportion value of the data stream, wherein each data stream comprises at least one frame;

means for incrementing at each frame each queue by the inverse of the proportion value;

means for creating an array of length equal to the sum of all queue lengths;

means for inserting into the array, until the array is filled, an identifier of the data stream corresponding to a filled queue; and means for emptying the filled queue.

means for receiving by a multiplexer, the plurality of data streams; and means for distributing uniformly by the multiplexer, a plurality of data streams onto a single data stream based on a proportional value; and means for receiving by a base station, the single data stream.

* * * * *